US008270418B2

(12) United States Patent
Vikberg et al.

(10) Patent No.: US 8,270,418 B2
(45) Date of Patent: Sep. 18, 2012

(54) ACCESS CONTROL IN A COMMUNICATION NETWORK

(75) Inventors: Jari Vikberg, Järna (SE); Tomas Nylander, Värmdö (SE); Hubert Przybysz, Hägersten (SE)

(73) Assignee: Telefonaktiebolget LM Ericsson (publ), Stockholm (SE)

( * ) Notice: Subject to any disclaimer, the term of this patent is extended or adjusted under 35 U.S.C. 154(b) by 884 days.

(21) Appl. No.: 12/282,573

(22) PCT Filed: Mar. 14, 2006

(86) PCT No.: PCT/EP2006/060714
§ 371 (c)(1),
(2), (4) Date: Feb. 18, 2009

(87) PCT Pub. No.: WO2007/104358
PCT Pub. Date: Sep. 20, 2007

(65) Prior Publication Data
US 2009/0303943 A1    Dec. 10, 2009

(51) Int. Cl.
*H04L 12/28* (2006.01)
(52) U.S. Cl. .......................................... 370/401; 726/3
(58) Field of Classification Search ........................ None
See application file for complete search history.

(56) References Cited

U.S. PATENT DOCUMENTS

| 2004/0085949 | A1* | 5/2004 | Partanen et al. ............... 370/352 |
| 2004/0111640 | A1 | 6/2004 | Baum |
| 2004/0190718 | A1 | 9/2004 | Dacosta |
| 2007/0083470 | A1* | 4/2007 | Bonner et al. .................. 705/51 |

FOREIGN PATENT DOCUMENTS

| WO | WO 2005/004527 A1 | 1/2005 |
| WO | WO 2005/114920 A1 | 12/2005 |

OTHER PUBLICATIONS

Garcia-Martin Ericsson E Henrikson Lucent D Mills Vodafone M: "Private Header (P-Header) Extensions to the Session Initiation Protocol (SIP) for the 3$^{rd}$ Generation Partnership Project (3GPP)" IETF Standard, Internet Engineering Task Force, IETF, CH, Jan. 2003, XP015009238 ISSN: 0000-0003 Abstract Paragraphs [04.3]-[04.4].

* cited by examiner

*Primary Examiner* — Kevin C Harper

(57) ABSTRACT

A method of controlling access to services of an IP Multimedia Subsystem (IMS) by a user based upon the user's location. In response to a user requesting access to a service, information identifying the user's location is provided to the IMS. Within the IMS, the provided information is compared with authorization information stored in a database. The authorization information includes information identifying prohibited and/or allowed access locations. Dependent upon the result of the comparison, access to the IMS services is allowed or denied.

12 Claims, 6 Drawing Sheets

ACCESS CONTROL IN A COMMUNICATION NETWORK

FIELD OF THE INVENTION

The present invention relates to access control in communication networks, for example in IP Multimedia Subsystem networks.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

FIG. 1 illustrates schematically how the IMS fits into the mobile network architecture in the case of a General Packet Radio Service (GPRS)/Packet Switched (PS) access network. Call Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. Of course, the IMS may be accessed from other access network types, for example a Wireless Local Area Network (WLAN) network.

SUMMARY OF THE INVENTION

Users of the IMS will access the services provisioned by the IMS via an access network, and more specifically via Access Points (APs) of an access network. An example of an AP may be a base station of a WLAN or a Node B of 3GPP cellular network. It may be desirable to allow operators of IMS networks to control which APs may be used to access to their networks. For example, a network operator may have negotiated a special tariff with a company that depends upon the company's employees accessing the operator's IMS network only via APs of the network operator.

According to a first aspect of the present invention there is provided a method of controlling access to services of an IP Multimedia Subsystem by a user based upon the user's location, the method comprising:

in response to a user requesting access to a service of the IP Multimedia Subsystem, providing information identifying the user's location to the IP Multimedia Subsystem;

within the IP Multimedia Subsystem, comparing the provided identification information with authorisation information stored on a database, the authorisation information comprising information identifying prohibited and/or allowed access locations; and dependant upon the result of the comparison, allowing or denying access to the IP Multimedia Subsystem services.

The user may request access to the communication network by sending a SIP REGISTER method to the IP Multimedia Subsystem, and the IP Multimedia Subsystem makes a registration decision based upon the comparison between the provided location information and authorisation information stored on the database.

In a preferred embodiment of the invention, said database is part of a Home Subscriber Server of a 3G network core network. However, this need not be the case, and the database may be a standalone node that can be contacted directly by the authorising node, e.g. by the S-CSCF, P-CSCF, or I-CSCF.

A method according to any one of the preceding claims, wherein the location information is provided to the IP Multimedia Subsystem by the user. Alternatively, the location information is obtained from an access point by a node of the IP Multimedia Subsystem.

Typically, said user requests access to the IP Multimedia Subsystem via an access point, and said information identifying the user's location is an identification of the access point. Preferably, the identification information comprises the access point's Media Access Control (MAC) address. A Connectivity Session Location and Repository Function may maintain identification information in respect of the access point, and provide this to an authorising node of the IP Multimedia Subsystem.

In a preferred embodiment of the invention, said comparison of the provided identification information with authorisation information stored on a database is performed at a Call Session Control Function of the IP Multimedia Subsystem network. Said Call Session Control Function may be one of a Serving Call Session Control Function, a Proxy Call Session Control Function, and an Interrogating Call Session Control Function.

Typically, said database stores information identifying prohibited and/or allowed locations on a per user basis, said user request identifying the user.

According to a second aspect of the present invention there is provided an access point for providing a gateway to allow a user to access services of an IP Multimedia Subsystem and comprising:

means for providing information identifying the access point to the IP Multimedia Subsystem, in response to a client requesting access to the communication network.

According to a third aspect of the present invention there is provided User Equipment for accessing services of an IP Multimedia Subsystem, the User Equipment comprising:

means for retrieving information identifying its current location; and means for sending the location information to the IP Multimedia Subsystem.

Preferably, said means for sending the location information to the IP Multimedia Subsystem is arranged to include the information in a service registration message.

According to a fourth aspect of the present invention there is provided a Call Session Control Function for use in an IP Multimedia Subsystem comprising:

input means for receiving information identifying the current location of a user attempting to access the IP Multimedia Subsystem;

query means for querying a database, the database comprising authorisation information identifying prohibited and/or allowed locations;

comparing means for comparing the received location information with the authorisation information; and means for allowing or denying access to the IP Multimedia Subsystem services in dependence upon the result of the comparison.

According to a fifth aspect of the present invention there is provided a system for controlling access to services of an IP Multimedia Subsystem by a user based upon the user's location, the system comprising:

transmitting means for providing information identifying the user's location to the IP Multimedia Subsystem in response to a user requesting access to a service of the IP Multimedia Subsystem;

first processing means within the IP Multimedia Subsystem, comparing the provided identification information with authorisation information stored on a database, the authorisation information comprising information identifying prohibited and/or allowed access locations; and second processing means for allowing or denying access to the IP Multimedia Subsystem services dependent upon the result of the comparison.

DETAILED DESCRIPTION OF THE PREFERRED EMBODIMENTS

Figure 1:
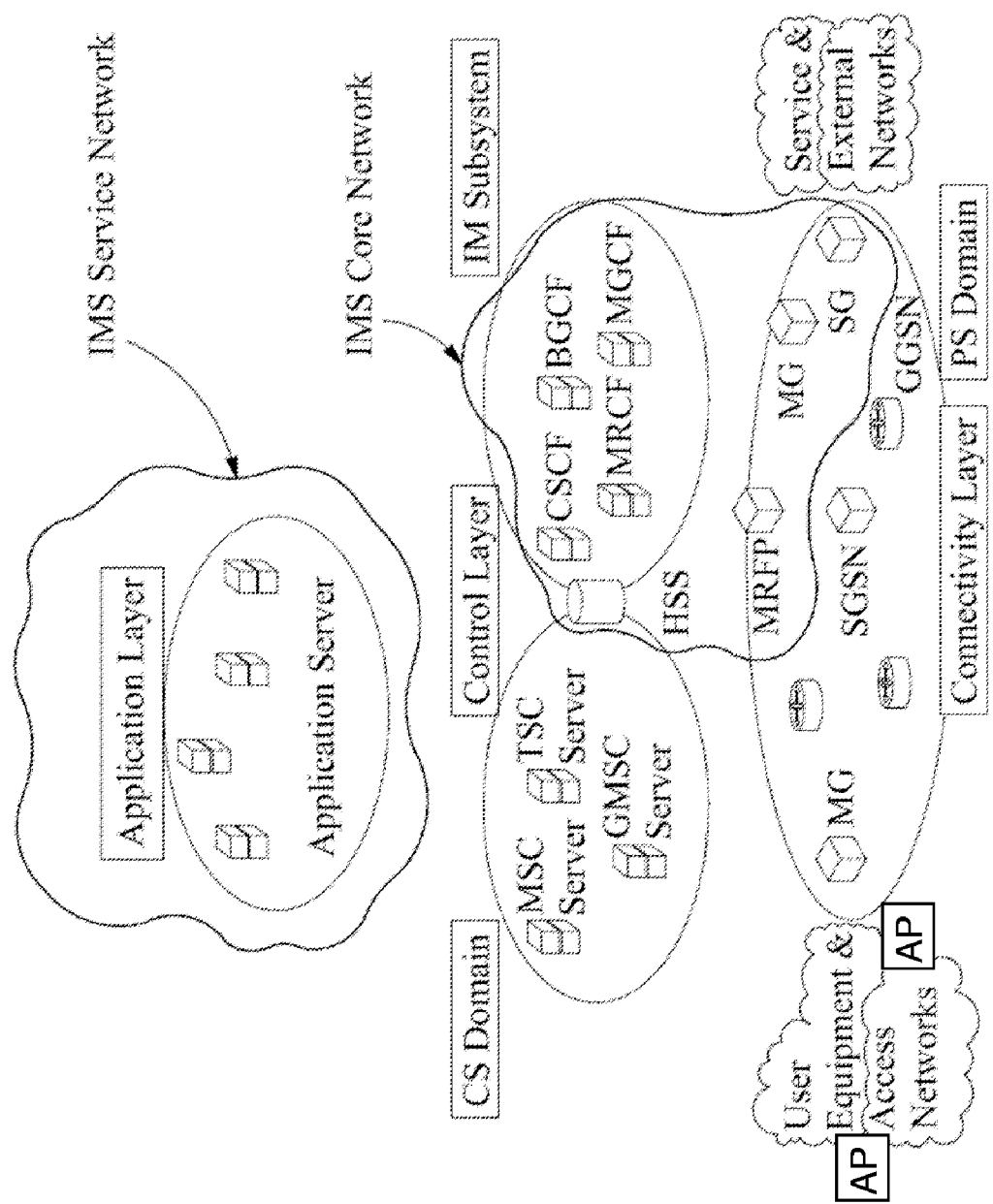
FIG. 1 illustrates schematically an IP Multimedia Subsystem.

When a user wishes to access services provisioned by an IP Multimedia Subsystem (IMS) network, the user must typically register with his or her home network (this may occur at power-on of the user's device). An IMS/SIP client in the user equipment initiates the registration process by sending a SIP REGISTER message to a Serving Call Session Control Function (S-CSCF) allocated to the user within the home network. On receipt of the REGISTER message, the home network can allow or deny access to the IMS network by the user. A user's device or User Equipment (UE) will communicate with the IMS via some suitable Access Point (AP). In the case of a mobile wireless terminal, the AP may be a base station of a Wireless Local Area Network (WLAN). Example APs are illustrated in the IMS over 3GPP architecture illustrated in FIG. 1. In addition to controlling user access to the IMS on the basis of user identity, the IMS operator may wish to control access based upon the used APs. In order to do this, the home network must have some means to identify the APs.

In a first embodiment, information identifying the AP is retrieved and provided by the UE to the user's home network for verification against an authorisation database (DB). The authorisation DB comprises information identifying which APs are authorized to access the IMS network. This may be a list of allowed APs, a list of non-allowed APs, or a list of both allowed and non-allowed APs. The authorisation DB is preferably provided as part of the Home Subscriber Server (HSS)—a component of the 3G IMS core network—although it is possible that the DB may be separate from the HSS. The list of allowed/non-allowed APs may be specific to a particular user.

When a user seeks to access the IMS network from his or her User Equipment, the IMS/SIP client in the User Equipment obtains the AP Media Access Control (MAC) address (and/or other attributes that identify the AP) used to identify the AP on the radio link layer, typically during the process of establishing the wireless link and IP connectivity. The MAC address is available in the lower protocol layers of the terminal so it needs to be possible for the IMS/SIP client to obtain the identification information. This may be done in an appropriate Application Programming Interface (API). Of course, if the AP identity is broadcast by the AP on a higher layer, there may be no need for an API.

Figure 2:
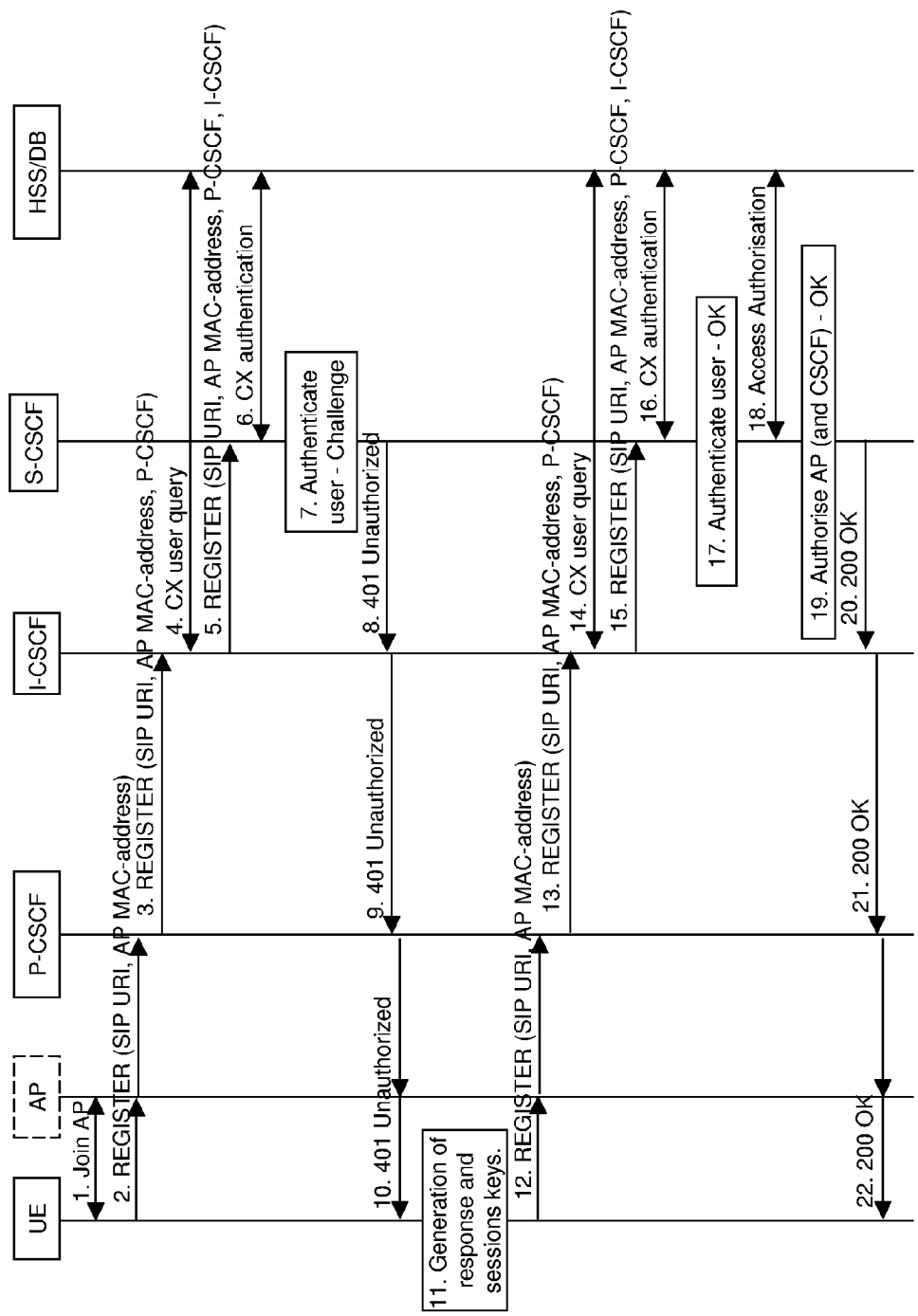
FIG. 2 illustrates a signalling sequence for attempted registration from an allowed AP where network access information is retrieved and provided by a client.

FIG. 2 shows a signalling sequence associated with successful registration of a user to the IMS. Initially, the UE joins to an AP and gains IP-connectivity. The registration is initiated by the UE sending a SIP REGISTER method addressed to the Proxy-Call Session Control Function (P-CSCF) using the IP connectivity provided by the AP. The AP routes the method to the P-CSCF. The REGISTER method includes the SIP URI of the UE, as well as the MAC address of the used AP among other information. The P-CSCF forwards the REGISTER message to an Interrogation Call Session Control Function (I-CSCF), which deals with registration, routing, charging and forwarding SIP messages. The REGISTER message is then forwarded from the I-CSCF to the Serving Call Session Control Function (S-CSCF). The signalling associated with these steps is illustrated in steps 1 to 5 of FIG. 2. [The functions of the S-CSCF include the management of mobile registrations and interactions with other services.] The S-CSCF contacts the HSS to authenticate the user at steps 6 and 7, and returns a 401Unauthorised response to the UE at steps 8 to 10. At step 11, the UE generates response and session keys, and sends these in a further SIP REGISTER method to the S-CSCF at steps 12 to 16. This REGISTER method again contains the MAC address of the AP among other information. At step 17, the S-CSCF authenticates the user based upon the information provided by the HSS.

After steps 1 to 17, steps 18 and 19 are carried out in order to authorise the used AP. This involves the S-CSCF querying the HSS to find out if access from the identified AP is to be allowed for the user. Once the authorisation has been given, a SIP 200 OK message is returned to the UE by the S-CSCF at steps 20 to 22. As is illustrated at step 19, the S-CSCF also optionally authorises the P-CSCF. This adds a further level of security to the authorisation process, and is particularly appropriate when a P-CSCF is allocated to a user or enterprise.

Steps 18 and 19 may be performed at an earlier stage in the registration procedure, for example after step 5 in FIG. 2 or even earlier (if performed by intermediate nodes—see below). Hence, the UE includes the MAC address in the initial register message as well as later register messages, as it does not know at which stage the S-CSCF will authorise the AP.

Figure 3:
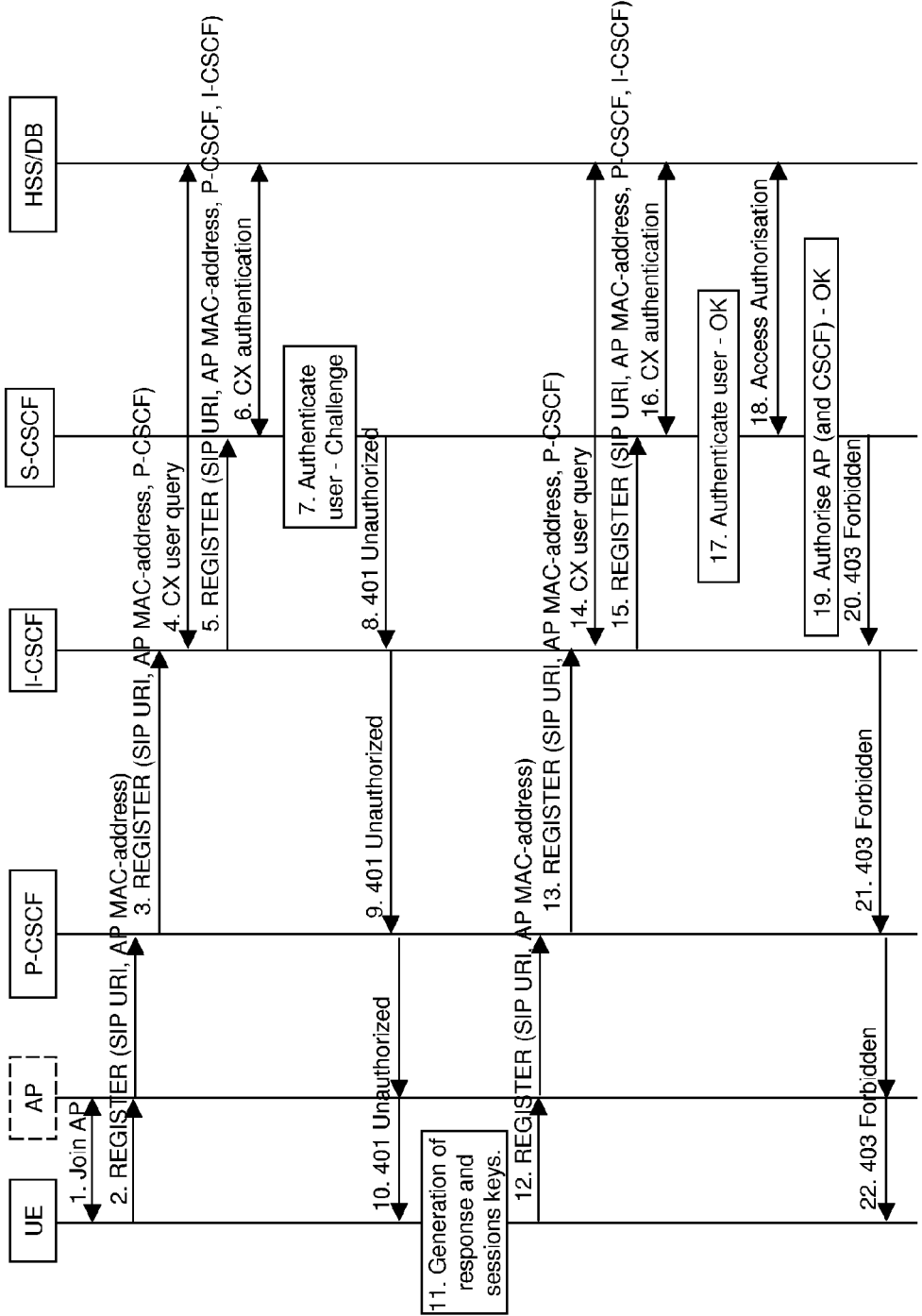
FIG. 3 illustrates a signalling sequence for attempted registration from a non-allowed AP where network access information is retrieved and provided by a client.

In the case of a user attempting to access the network from a non-allowed AP, the SIP registration is rejected. The signalling sequence of FIG. 3 is followed in this case. Steps 1 to 18 are identical to those shown in FIG. 2 for an authorized AP. However, in this second scenario, the S-CSCF query of the HSS leads to denial of access to the IMS network at steps 18 and 19. A SIP 403 Forbidden message is returned to the UE at steps 20 to 22. A text string explaining the reason for rejection could be included and displayed on the UE.

In the event of refusal of registration when the IMS/SIP client is attempting to register from a non-authorized AP, the IMS/SIP client may build a list of non-authorised APs, and not attempt to register with the home network via one of the non-authorised APs.

In the embodiment described above, where information identifying the AP is provided to the user's home network by the client, the authorisation process does not require support in the network providing connectivity between the User Equipment (UE) and the IMS domain. However, an alternative approach allows access network information to be retrieved by the user's home network, thus requiring new network support to be provided.

According to this alternative approach, information in the SIP message sent by the IMS/SIP client to the user's home network is used to validate the origin of the SIP REGISTER (e.g. by examining the 'VIA' header), checking for example that the correct P-CSCF is being used. The different hosts and IP-addresses traversed may also indicate the origin of the registration request. As part of the SIP registration procedure the P-CSCF includes the AP MAC address (and possibly other attributes that identify the AP). P-Access-Network-Info header may be used to transport this information.

Figure 4:
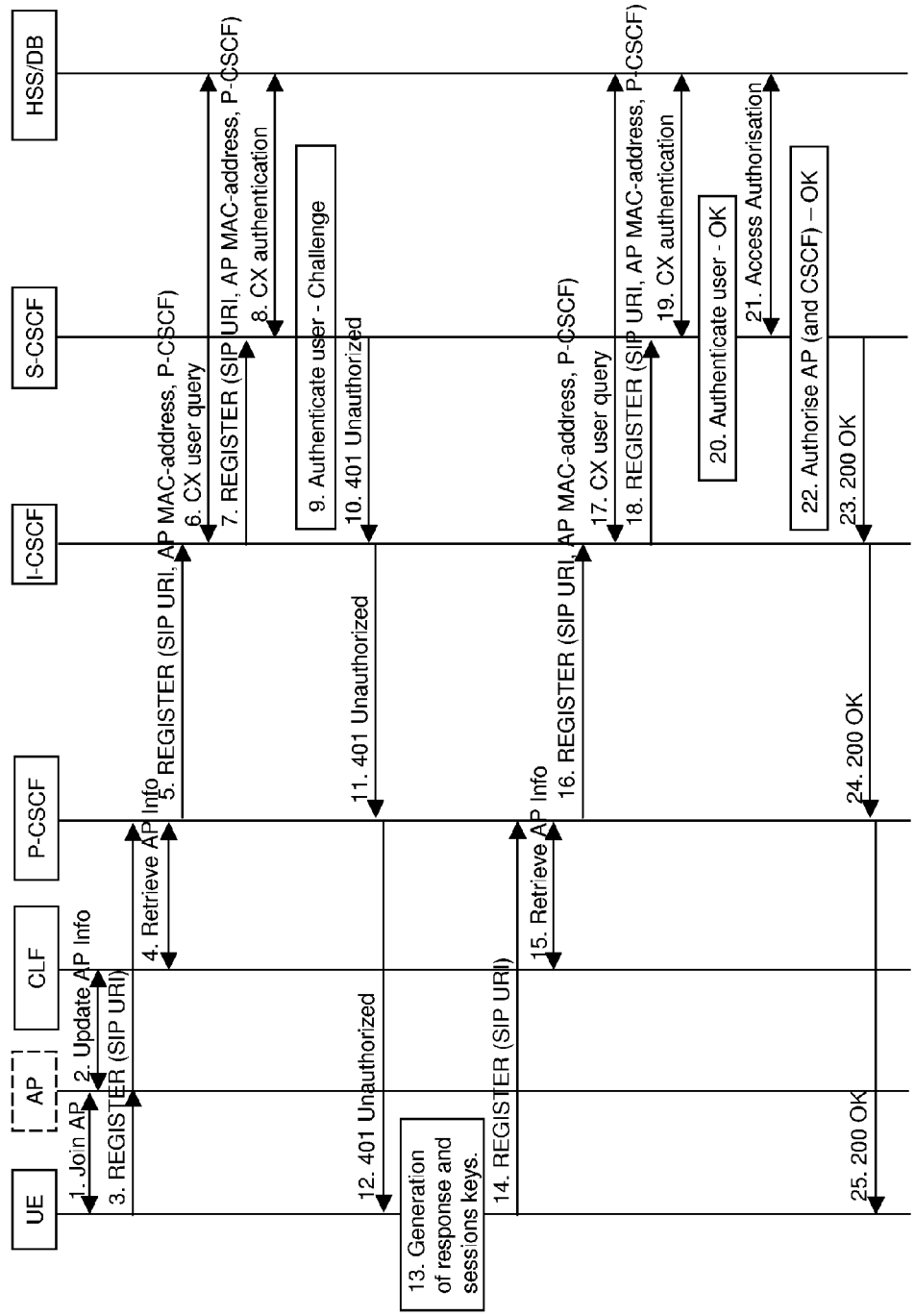
FIG. 4 illustrates a signalling sequence for attempted registration from an allowed AP where network access information is provided and retrieved from the access network.

FIG. 4 shows a typical registration sequence, with the addition of steps 2, 4, 15, 21 and 22. In step 2 of FIG. 4, the access network updates the CLF with the identifying AP information, where CLF stands for Connectivity Session Location and Repository Function and is a logical entity defined in ETSI TISPAN NGN Release 1—Draft ETSI ES 282 004. In steps 4 and 15 the P-CSCF retrieves the AP identification information based on the IP address assigned to the UE. In steps 21 and 22, the HSS is queried by the S-CSCF to find out if access from the identified AP is to be allowed for the end user.

The HSS (or other database) may authorise the AP based upon any appropriate combination of the information retrieved (from the CLF). For example, the UE identified by the SIP URI need not be taken into account, and only the AP MAC address is checked in combination with, for example, the originating P-CSCF. Alternatively, the SIP URI may be checked together with the AP MAC address and the P-CSCF identity, to decide whether or not access is to be allowed. This might be appropriate, for example, where predetermined users are authorised to access the network from predefined APs.

Figure 5:
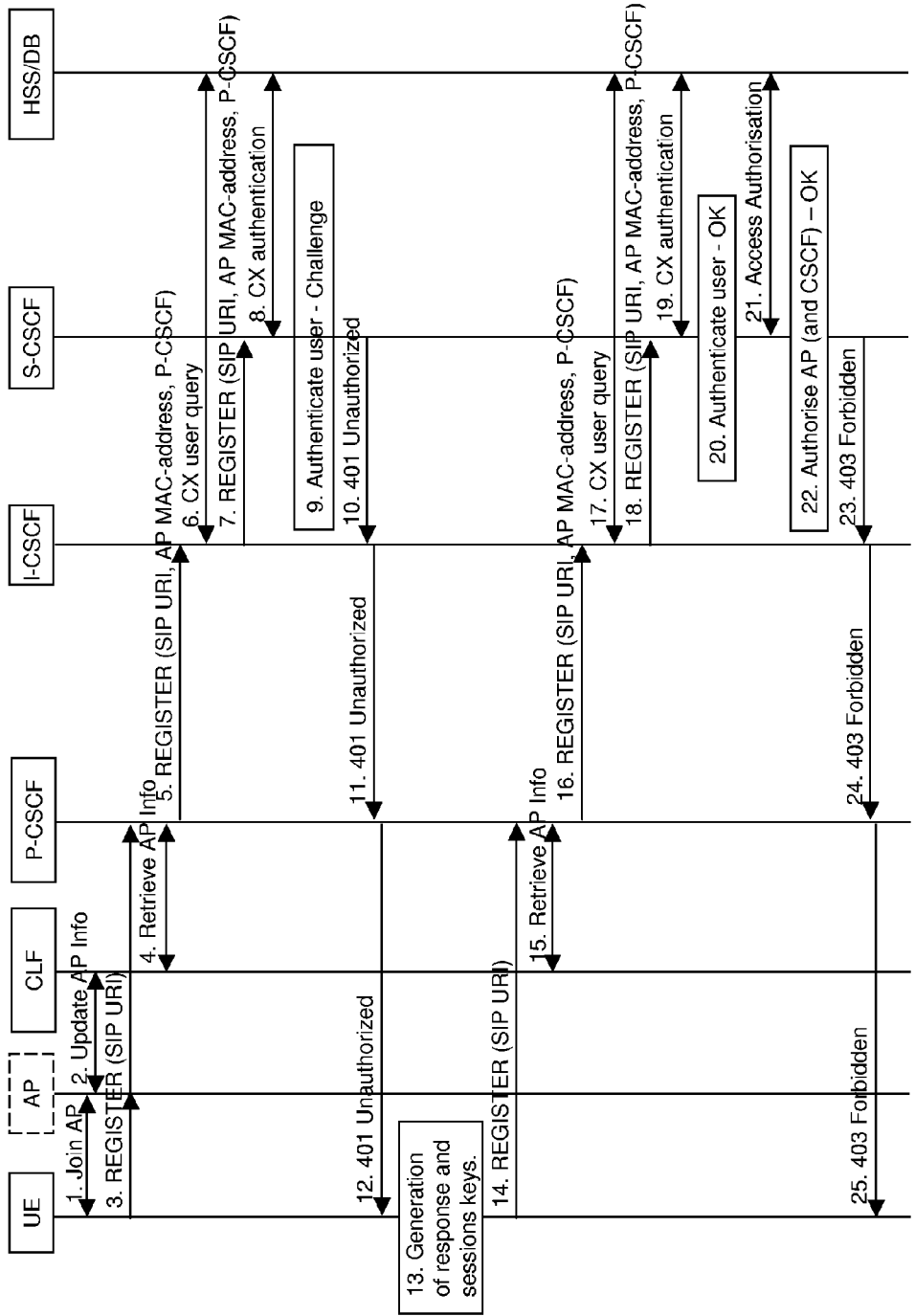
FIG. 5 illustrates a signalling sequence for attempted registration from a non-allowed AP where network access information is provided and retrieved from the access network.

In the example in FIG. 4, the registration to the IMS network is allowed, and the SIP 200 OK message is returned to the UE at steps 23 to 25. In the case of a non-allowed AP, the SIP registration is rejected, the process following the sequence shown in FIG. 5. A SIP 403 Forbidden message is returned to the UE at steps 23 to 25. The SIP 403 Forbidden message may be accompanied by a text string explaining the reasons for rejection.

Figure 6:
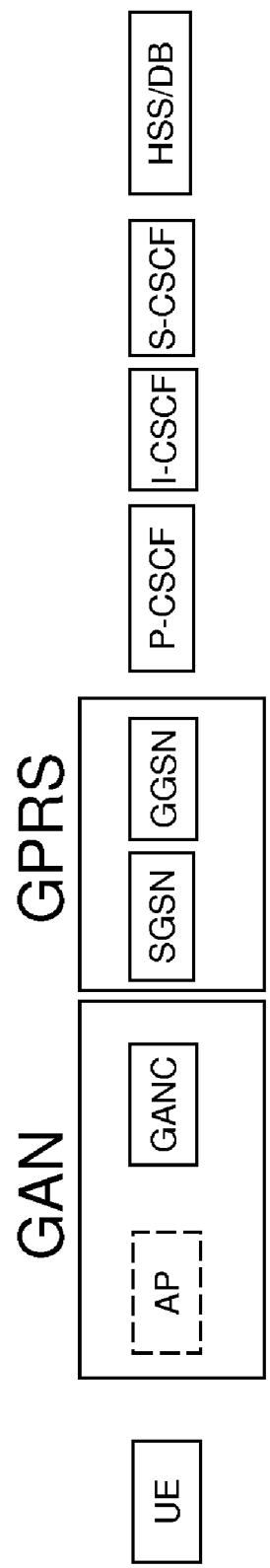
FIG. 6 illustrates access control in a Generic Access Network (GAN).

According to a further embodiment, a request for accessing an IMS network is made using a Generic Access Network (GAN), as illustrated in FIG. 6. The same principles described for the first and second embodiments apply. In this third embodiment, the user's home network is accessed using the GAN and General Packet Radio Service (GPRS). The AP provides IP connectivity for the UE and this is used to access a GAN Controller (GANC) in the GAN. When the UE has established the transmission link over the GAN and GPRS, it attempts to register with the IMS domain as described for the first or second specific embodiments.

It will be appreciated by persons skilled in the art that various modifications may be made to the embodiments described above without departing from the scope of the present invention. For example, the above description refers mainly to wireless access solutions, e.g. a mobile terminal with Wireless Local Area Network (WLAN). However, the invention may be adapted for fixed access networks, for example in the case of a PC with an IMS/SIP client where the IMS/SIP client is only allowed to be used on a certain PC or on a certain network.

In the WLAN case, the prime identifier of the AP is the hardware address of the AP, i.e. the MAC address. However, other attributes may be considered as alternatives, or in combination with the MAC address, for example the Service Set Identifier (SSID network identifier), encryption keys used on the wireless network etc.

In the case of a PC, where the client is tied to a specific PC, the MAC address of the PC could be used. Where a PC is only allowed access to a particular network, a network identifier, for example an identifier received with Dynamic Host Configuration Protocol (DHCP) options, could be used, or the IP address of the enterprise Domain name server (DNS), which may also be obtained via DHCP.

In the case of a mobile cellular terminal, the GSM/UTRAN cell where the mobile terminal is currently located is known to the network and to the terminal, and can also be used as identification information by the S-CSCF/HSS.

In the various embodiments considered above, it is the S-CSCF of the IMS which is responsible for authorising an AP, via the HSS or other database. However, it will be appreciated that other nodes within the IMS may take responsibility for this, for example the P-CSCF or the I-CSCF. In this case, the P-CSCF or I-CSCF will communicate directly with the HSS or other database. Alternatively, it may be possible to perform authorisation at the CLF.

The invention claimed is:

1. A method of controlling access to services of an IP Multimedia Subsystem by a user equipment based upon an access point used to access the IP Multimedia Subsystem, the method comprising:

upon joining of the user equipment with the access point, storing a Media Access Control (MAC) address of the access point in a Connectivity Session Location and Repository Function (CLF);

subsequently, in response to the user equipment requesting access to a service of the IP Multimedia Subsystem, providing information by the CLF identifying the access point to the IP Multimedia Subsystem, the identifying information comprising the MAC address of the access point used to access the IP Multimedia Subsystem;

within the IP Multimedia Subsystem, comparing the provided identification information with authorization information stored in a database, the authorization information comprising information identifying prohibited or allowed access points; and dependent upon the result of the comparison, allowing or denying access to the IP Multimedia Subsystem services.

2. The method according to claim 1, wherein the user requests access to the communication network by sending a SIP REGISTER method to the IP Multimedia Subsystem, and the IP Multimedia Subsystem makes a registration decision based upon the comparison between the provided identifying information and authorization information stored in the database.

3. The method according to claim 1, wherein said database is part of a Home Subscriber Server of a 3G core network.

4. The method according to claim 1, wherein the identifying information is provided to the IP Multimedia Subsystem by the user.

5. The method according to claim 1, wherein the identifying information is obtained from an access point by a node of the IP Multimedia Subsystem.

6. The method according to claim 5, wherein the step of providing information by the CLF identifying the access point to the IP Multimedia Subsystem includes providing the identification information in response to a retrieval request from a Proxy Call Session Control Function (P-CSCF) that receives the access request from the user equipment.

7. The method according to claim 1 and comprising performing said comparison of the provided identification information with authorization information stored in a database at a Call Session Control Function of the IP Multimedia Subsystem network.

8. The method according to claim 7, wherein said Call Session Control Function is one of a Serving Call Session Control Function, a Proxy Call Session Control Function, and an Interrogating Call Session Control Function.

9. The method according to claim 1, wherein said database stores information identifying prohibited or allowed access points on a per user basis, said user request identifying the user.

10. An access point for providing a gateway to allow a user equipment to access services of an IP Multimedia Subsystem, said access point comprising:

means for providing information identifying the access point to a Connectivity Session Location and Repository Function (CLF) when the user equipment joins with the access point, the identifying information comprising a Media Access Control (MAC) address of the access point; and forwarding means for forwarding to the IP Multimedia Subsystem, a subsequent request from the user equipment to access a service of the IP Multimedia Subsystem, the request triggering a node of the IP Multimedia Subsystem to retrieve the identifying information of the access point from the CLF for comparison with a database of prohibited or allowed access points.

11. A Proxy Call Session Control Function (P-CSCF) for use in an IP Multimedia Subsystem, the P-CSCF comprising:

input means for receiving a request from a user equipment to access a service of the IP Multimedia Subsystem;

retrieval means, responsive to receiving the request, for retrieving from a Connectivity Session Location and Repository Function (CLF), identifying information of the access point utilized by the user equipment, the identifying information comprising a Media Access Control (MAC) address of the access point; and output means for modifying the request to include the identifying information of the access point, and for sending the modified request to the IP Multimedia Subsystem for comparison of the identifying information with a database of prohibited or allowed access points.

12. A system for controlling access to services of an IP Multimedia Subsystem by a user equipment, the system comprising:

an access point having the user equipment joined;

a Connectivity Session Location and Repository Function (CLF) in communication with the access point;

a Proxy Call Session Control Function (P-CSCF) in communication with the access point, the CLF, and an Interrogating Call Session Control Function (I-CSCF);

a subscriber database configured to store information regarding prohibited or allowed access points for the user equipment; and a Serving Call Session Control Function (S-CSCF) in communication with the I-CSCF and the subscriber database;

wherein the access point is configured to send a Media Access Control (MAC) address of the access point to the CLF upon joining the user equipment, wherein upon receiving a subsequent request from the user equipment to access a service of the IP Multimedia Subsystem, the access point is configured to forward the request to the P-CSCF;

wherein the P-CSCF is configured to retrieve the MAC address of the access point from the CLF, to modify the request to include the MAC address of the access point, and to send the modified request to the I-CSCF for forwarding to the S-CSCF;

wherein the S-CSCF is configured to:

retrieve from the subscriber database, the information regarding prohibited or allowed access points for the user equipment;

compare the MAC address of the access point with the information retrieved from the subscriber database; and allow or deny access to the IP Multimedia Subsystem services dependent upon a result of the comparison.

* * * * *

UNITED STATES PATENT AND TRADEMARK OFFICE
CERTIFICATE OF CORRECTION

PATENT NO. : 8,270,418 B2  
APPLICATION NO. : 12/282573  
DATED : September 18, 2012  
INVENTOR(S) : Vikberg et al.

Page 1 of 1

It is certified that error appears in the above-identified patent and that said Letters Patent is hereby corrected as shown below:

On the Face Page, in Field (73), under "Assignee", in Column 1, Line 1, delete "Telefonaktiebolget" and insert -- Telefonaktiebolaget -- ,therefor.

Signed and Sealed this
Twenty-sixth Day of February, 2013

Teresa Stanek Rea
*Acting Director of the United States Patent and Trademark Office*